(12) United States Patent
Rochberger et al.

(10) Patent No.: US 6,760,309 B1
(45) Date of Patent: Jul. 6, 2004

(54) METHOD OF DYNAMIC PRIORITIZATION OF TIME SENSITIVE PACKETS OVER A PACKET BASED NETWORK

(75) Inventors: Haim Rochberger, Tel Mond (IL); Gad Azriel, Holon (IL); Sarit Shani Natanson, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/535,769

(22) Filed: Mar. 28, 2000

(51) Int. Cl.[7] .................................................. H04J 3/14
(52) U.S. Cl. ........................ 370/235; 370/229; 370/238; 370/395.4; 370/412; 370/468; 370/389
(58) Field of Search ................................. 370/468, 229, 370/230, 412, 389, 235, 328, 395.4

(56) References Cited

U.S. PATENT DOCUMENTS 5,566,170 A * 10/1996 Bakke et al. .................. 370/60
6,091,709 A * 7/2000 Harrison et al. ............ 370/235

OTHER PUBLICATIONS

Comer, D. [1995], Internetworking with TCP/IP vol. I: Principles, Protocols, and Architecture, 3rd Edition, Prentice Hall, Upp Saddle River, New Jersey, p. 99.*

International Telecommunication Union, H.225.0, Annex A, RTP/RTCP, Feb. 1998, pp. 73–106.
International Telecommunication Union, H.323, Draft v4, Aug. 1999, Chapters 6 and 7, pp. 13–52.
Packet Telephony Primer, 3COM Corporation, Mar. 1998.
Converged Networks and the Need for Traffic Prioritization, 3COM Corporation, Mar. 1999.

* cited by examiner

*Primary Examiner*—Huy D. Vu
*Assistant Examiner*—Lawrence Baranyai
(74) *Attorney, Agent, or Firm*—Howard Zaretsky; Zaretsky & Associates PC

(57) ABSTRACT

An apparatus for and a method of dynamically prioritizing packets over a packet based network. Packets are dynamically prioritized on the basis of their 'time to live' in the network as they travel from one network entity to another. Packets are assigned a priority in accordance with how 'old' or 'young' they are. Packets with a relatively long time left to live are assigned lower priority then those with relatively little time left to live. A time to live (TTL) field is added to the packet as it travels from one network entity to another. The contents of the time to live (TTL) field represents how 'young' or 'old' the packet is and conveys the time left before the packet is no longer of any use. Each network entity that receives the packet with a TTL field, subtracts from it the time the packet spends passing through that entity. The field decreases as it hops from network entity to entity until it reaches its destination or is discarded.

24 Claims, 9 Drawing Sheets

METHOD OF DYNAMIC PRIORITIZATION OF TIME SENSITIVE PACKETS OVER A PACKET BASED NETWORK

FIELD OF THE INVENTION

The present invention relates generally to voice over IP networks and more particularly relates to a method of dynamically assigning priority to packets over an Internet Protocol (IP) based network.

BACKGROUND OF THE INVENTION

Separate Voice and Data Networks

Currently, there is a growing trend to converge voice and data networks so that both utilize the same network infrastructure. The objective is to create a single fabric that is designed to deliver both voice and data, thus enhancing the effectiveness and productivity of individuals in an enterprise. The currently available systems that combine voice and data have limited applications and scope. An example of such a system is the Automatic Call Distribution (ACD), which permits service agents in call centers to access customer files in conjunction with incoming telephone calls. ACD centers, however, remain costly and difficult to deploy, requiring custom systems integration in most cases. Another example system is the voice logging/auditing system used by emergency call centers (e.g., 911) and financial institutions. Deployment has been limited due to the limited scalability of the system since voice is on one network and data is on another, both tied together by awkward database linkages.

The aim of packet telephony is to provision voice over packet switched fabrics in both the local area network (LAN) and the wide area network (WAN). Currently, voice and data generally flow over separate networks, the goal being to transmit them both over a single medium.

A block diagram illustrating example separate prior art data and voice networks is shown in FIG. 1. The LAN portion, generally referenced 10, comprises the LAN cabling infrastructure 12 and one or more network devices connected to the LAN. Examples of typical network devices include servers 14 and workstations 16. The voice portion, generally referenced 20, has at its core a private branch exchange (PBX) 24 which comprises one or more trunk line interfaces and one or more telephone extension interfaces. The PBX is connected to the public switched telephone network (PSTN) 22 via one or more trunk lines 28, e.g., analog, T1, E1, T3, ISDN, etc. A plurality of user telephones 26 is also connected directly to the PBX via phone line extensions 29.

The paradigm currently in wide spread use consists of circuit switched fabric 20 for voice networks and a completely separate LAN infrastructure 10 for data. Most enterprises today use proprietary PBX equipment for voice traffic.

Voice and Data Over a Shared Network

An increasingly common packet telephony paradigm consists of telephone and data tightly coupled on packet based, switched, multimedia networks where voice and data share a common transport mechanism. It is expected that this paradigm will spur the development of a wealth of new applications that take advantage of the simultaneous delivery of voice and data over a single unified fabric.

A block diagram illustrating a voice over packet network where voice and data share a common infrastructure is shown in FIG. 2. The IP telephony system, generally referenced 30, comprises, a LAN infrastructure represented by an Ethernet switch 32, one or more telephones 36, workstations 34, a gateway 42, a gatekeeper 46 and Layer 3 switch 38. The key components of an IP telephony system 30 are the modified desktop, gatekeeper and gateway entities. For the desktop, users may have an Ethernet phone 36 that plugs into an Ethernet RJ-45 jack or a handset or headset 35 that plugs into a PC 37.

Today, all LAN based telephony systems need to connect to the PSTN 44. The gateway is the entity that is specifically designed to convert voice from the packet domain to the circuit switched domain. The gatekeeper is primarily designed to control the creation of real time connections over the network.

The IP telephony traffic is supported by a packet infrastructure such as an Ethernet based network. Telephony calls traversing the intranet may pass through a Layer 3 switch 38 connecting a corporate intranet 40. The Layer 3 switch should support Quality of Service (QoS) features such as IEEE 802.1p and 802.1Q and Resource ReSerVation Protocol (RSVP) described in IETF RFC 2205 entitled "Resource ReSerVation Protocol (RSVP)—Version 1 Functional Specification".

ITU-T Recommendation H.323

The International Telecommunications Union (ITU-T) Telecommunications Standardization Sector has issued a number of standards related to telecommunications. The Series H standards deals with audiovisual and multimedia systems and describes standards for systems and terminal equipment for audiovisual services. The H.323 standard is an umbrella standard that covers various audio and video encoding standards. Related standards include H.225.0 that covers media stream packetization and call signaling protocols and H.245 that covers audio and video capability exchange, management of logical channels and transport of control and indication signals. Details describing these standards can be found in ITU-T Recommendation H.323 (Draft 4 Aug. 1999), ITU-T Recommendation H.225.0 (February 1998), H.245 (Jun. 3, 1999), H.261, H.263, T.120, G.722. G.723, G.728 and G.729.

A block diagram illustrating example prior art H.323 compliant terminal equipment is shown in FIG. 3. The H.323 terminal 50 comprises a video codec 52, audio codec 54, system control 56 and H.225.0 layer 64. The system control comprises H.245 control 58, call control 60 and Registration, Admission and Status (RAS) control 62.

Attached video equipment 66 includes any type of video equipment, such as cameras and monitors including their control and selection, and various video processing equipment. Attached audio equipment 70 includes devices such as those providing voice activation sensing, microphones, loudspeakers, telephone instruments and microphone mixers. Data applications and associated user interfaces 72 such as those that use the T.120 real time audiographics conferencing standard or other data services over the data channel. The attached system control and user interface 74 provides the human user interface for system control. The network interface 68 provides the interface to the packet based network, supports the appropriate signaling and voltage levels in accordance with appropriate standards. Typical packet based networks include Ethernet and Token Ring.

The video codec 52 functions to encode video signals from the video source (e.g., video camera) for transmission over the network and to decode the received video data for output to a video display. If a terminal incorporates video communications, it must be capable of encoding and decoding video information in accordance with H.261. A terminal may also optionally support encoding and decoding video in accordance with other recommendations such as H.263.

The audio codec 54 functions to encode audio signals from the audio source (e.g., microphone) for transmission over the network and to decode the received audio data for output to a loudspeaker. All H.323 terminals must be capable of encoding and decoding speech in accordance with G.711 including both A-law and $\mu$-law encoding. Other types of audio that may be supported include G.722, G.723, G.728 and G.729.

The data channel supports telematic application such as electronic whiteboards, still image transfer, file exchange, database access, real time audiographics conferencing (T.120), etc. The system control unit 56 provides services as defined in the H.245 and H.225.0 standards. For example, the system control unit provides signaling for proper operation of the H.323 terminal, call control, capability exchange, signaling of commands and indications and messaging to describe the content of logical channels. The H.225.0 Layer 64 is operative to format the transmitted video, audio, data and control streams into messages for output to the network interface. It also functions to retrieve the received video, audio, data and control streams from messages received from the network interface 68. In addition, it also performs logical framing, sequence numbering and error detection and error correction in accordance with the particular media type.

The gateway functions to convert voice from the packet domain to the circuit switched domain. In particular, it converts packetized voice to a format that can be accepted by the Switched Circuit Network (SCN) such as the PSTN. Packetized voice denotes voice that has been digitized and placed into an Ethernet frame. The gateway provides the appropriate translation between different video, audio and data transmission formats and between different communications procedures.

Note that since the digitization format for voice on the packet network is often different than on the SCN, the gateway needs to provide this type of conversion that is known as transcoding. Note also that gateways also function to pass signaling information such as dial tone, busy tone, etc. Typical connections supported by the gateway include analog, T1, E1, ISDN and ATM at OC-3 and higher rates. Additional functions performed by the gateway include call setup and clearing on both the network side and the Switched Circuit Network (SCN) side. The gateway may be omitted if communications with SCN terminals is not required.

The gatekeeper functions to provide call control services to terminal endpoints on the network. It is primarily designed to control the creation of real time connections over the network. Applications register themselves with the gatekeeper before attempting to bring up a session. The gatekeeper may deny a request to bring up a session or may grant the request at a reduced data rate. This is particularly relevant to video connections that typically consume huge amounts of bandwidth for a high quality connection. The gatekeeper also is responsible for call control, call management and other voice intelligent functions.

The gatekeeper is optional and more than one may be present in the network. In particular, the services provided by the gatekeeper include call control signaling, call authorization, bandwidth management, call management and address translation.

Call control signaling is optional as the gatekeeper may choose to complete the call signaling with the H.323 endpoints and process the call signaling or it may direct the endpoints to connect the call signaling channel directly to each other, thus the gatekeeper avoids handling the H.225.0 call control signals.

Through the use of H.225.0 signaling, the gatekeeper may reject calls from a terminal due to authorization failure. The reasons for rejection may include restricted access to or from particular terminals or gateways, or restricted access during certain time periods.

Bandwidth management entails controlling the number of H.323 terminals that are allowed to simultaneously access the network. Via H.225.0 signaling, the gatekeeper may reject calls from a terminal due to bandwidth limitations. This may occur if the gatekeeper determined that there is not sufficient bandwidth available on the network to support the call.

The call management function performed by the gatekeeper includes maintaining a list of currently active H.323 calls. This information is used to indicate that a terminal is busy and to provide information for the bandwidth management function.

The gatekeeper also provides address translation whereby an alias address is translated to a Transport Address. This is performed using a translation table that is updated using Registration messages, for example.

Real-Time Transport Protocol

The H.225.0 standard defines the Real-Time Transport Protocol (RTP) which provides end-to-end delivery services for data with real-time characteristics, such as interactive audio and video. These services include payload type identification, sequence numbering, time stamping and delivery monitoring. Typically, applications run RTP on top of UDP to take advantage of the multiplexing and checksum features of UDP. RTP may, however, be used with other suitable underlying network or transport protocols.

RTP does not itself provide any mechanism to ensure timely delivery or other QoS guarantees, but relies on lower layer services to do so. It also does not guarantee delivery or prevent out of order delivery, nor does it assume that the underlying network is reliable and delivers packets in sequence. The sequence numbers included in RTP allow the receiver to reconstruct the sender's packet sequence.

RTP is intended to be flexible so as to provide the information required by a particular application. Unlike conventional protocols in which additional functions may be accommodated by making the protocol more general or by adding an option mechanism that required parsing, RTP can be tailored through modifications and/or additions to the headers.

The RTP Control Protocol (RTCP) functions to periodically transmit control packets to all participants in a session. The primary function of RTCP is to provide feedback on the quality of the data distribution that may be useful for the control of adaptive encodings. RTCP also carries a transport level identifier for an RTP source called the canonical name or CNAME. Receivers require the CNAME to associate multiple data streams from a given participant in a set of related RTP sessions. The RTCP protocol can also be used to convey session control information such as participant identification.

Each RTCP packet begins with a fixed header followed by structured elements of variable length.

Impairments to Voice Quality

The voice quality perceived by the user is most affected by transmission delays across the network fabric. The transmission delays cause gaps in the conversation when one party stops talking and the other begins speaking. Delays can be introduced at any number of points in the network. One source of delay is the encoding of voice from analog which is exacerbated by voice compression algorithms that require large numbers of samples of the voice stream before compressing and packetizing the data. A similar delay occurs at the remote end when the voice is converted back to analog.

Additional delays are incurred as the packet propagates through the packet network. Propagation delays can be minimized in cases where the packet remains on a LAN with wire speed switches. There can be considerable delays, however, at the LAN/WAN boundary where Layer 3 switches or other access devices may add potentially large queuing delays created by the disparities in speed between LAN and WAN.

Another problem, known as jitter, is caused by the variation in delay as may be produced in a shared network such as Ethernet. Jitter delays occur primarily because of traffic conditions on the backbone network. In particular, the delays generated as a packet travels from user to user (i.e., network entity to network entity) may be generated due to the statistical nature of packet collisions. Telephone conversations are particularly sensitive to a problem known as head-of-line blocking whereby a voice packet gets stuck in a queue behind other less time critical packets. This happens when all the packets arriving in a switch or other network device are treated with the same priority. Packets following this one, however, may not experience the same delay thus giving rise to an oscillation situation.

In an IP network, the problem is emphasized by the deployment of network elements such as bridges and routers which also suffer from the statistical nature of packet collisions. Routers are network elements that incorporate a number of ports, each connected to a different subnet. Routers generally use ingress queuing to transfer packets from subnet to subnet, which causes packet delays.

Another source of jitter is the lack of a network-synchronized clock. Thus, each node uses its own internal clock which is not synchronized to any of the clocks in other nodes.

Another problem is loss of packets. Most end stations using data connections are designed to accept and recover from an occasional lost packet. The human ear, however, is not very tolerant of lost packets. A user will hear annoying gaps and clicks if the network does not provide techniques such as forward error correction to combat this. The effect on users depends on the packet loss rate and the compression algorithm used. The higher compression schemes are less forgiving.

Therefore, when a packet travels from one point in the network to another via the shared network (e.g., Ethernet), it is normally not possible to predict what the end-to-end delay will be. In a packet telephony application, as more and more calls are established, a congestion problem is likely to ensue as it is impossible to know which packets will go where.

One prior art attempt to solve the unpredictable nature of the jitter delay problem is to assign a priority to the specific stream. The use of priority was intended to address the huge growth in network traffic brought about by the increased use and reliance on business process applications. No matter how fast the underlying network, e.g., 10 Mbps, 100 Mbps or Gigabit Ethernet, congestion may still occur such as when two traffic streams compete for a single output port or when the speed of the incoming traffic exceeds the transmission rate of the outgoing port. Under these conditions, the network element (e.g., switch or router) must buffer some traffic while transmitting the rest. Prioritizing the traffic can help especially when the network carries real-time traffic such as voice or video which must be delivered with sufficient quality of service to be acceptable.

The IEEE 802.1p standard provides a mechanism whereby priority tags can be used to indicate traffic priority. Traffic is assigned one of eight traffic classes values which is carried in a priority field in the packet header. For Ethernet frames, 802.1Q VLAN tags include a three-bit priority indication. The 802.1D LAN bridging standard provides expedited traffic capabilities to support transmission of time critical information in a LAN environment.

Another prior art attempt to solve the problem involves reserving bandwidth for higher priority traffic (e.g., RSVP protocol).

These prior art solutions, however, have the disadvantage that they are either wasteful of bandwidth or they do not solve the congestion/jitter problem when some segments of the path are transmitting packets in sessions that have the same priority. In other words, the problem is how to prioritize (and ultimately differentiate) multiple packets when they all have the same priority.

SUMMARY OF THE INVENTION

The present invention solves the problems associated with the prior art by providing an apparatus for and a method of dynamically prioritizing packets over a packet based network. Such a packet network may comprise, for example, an IP based network running over Ethernet, Token ring, etc. The present invention provides a solution to the congestion problem that is not resolved by prior art priority schemes.

The present invention dynamically prioritizes packets on the basis of their 'time to live' in the network. In other words, packets are assigned a priority in accordance with their degree of freshness or staleness. Packets with a relatively long time left are given lower priority then those with relatively little time left before they are of no use. In general, packets generated by real-time multimedia applications such as audio, video, etc. have a finite life span. Once that life span has passed, they are of little value. Thus, in a real-time audio application, for example, packets must arrive at their destinations in sufficient time to be played to the user in analog format. Packets representing a user's voice corresponding to a point in time earlier than the current time are useless as their window of playback has passed. These packets are of no use to the user as their time has passed and they are thus discarded.

The present invention is operative to add a field to the packet as it travels from entity to entity in the network. The contents of the time to live (TTL) field represents how 'young' or 'old' the packet is and conveys the time left before the packet is no longer any use to the application that is to receive it. Each network entity that receives the packet with a TTL field, subtracts from it the time the packet spends passing through that entity. Thus, the TTL field decreases as it hops from network entity to entity.

The source or originator of the packet is operative to set the initial value of the TTL field and place in into the packet.

For example, the RTP packet can be used with the TTL information placed in the payload or in a header extension as provided for in the ITU-T Recommendation H.225.0.

In accordance with the invention, network entities maintain one or more queues corresponding to different classes of priorities and/or delay sensitive data streams. The entity is configured with a mapping that converts a TTL value to a corresponding priority. The packet is then placed in the appropriate queue in accordance with its priority. Packets are retrieved from the queues and processed in order of priority. A minimum allocation of processor resources, however, is assigned to each queue.

After processing, the time the packet spent in the entity is calculated and subtracted from the TTL field. The packet is then forwarded to the next hop along the path.

Note that the present invention is effective to dynamically assign a priority to the individual packets within a data stream belonging to a particular session. The priority is dynamically assigned based on the level of congestion experienced by the individual packet along the path. Prior art protocols cannot assign different priorities to individual packets on a dynamic basis. Existing protocols such as RSVP assign priority on a session basis where the same priority is assigned to the entire data stream for that session.

There is provided in accordance with the present invention a method for dynamically prioritizing time sensitive packets for transmission over a packet based network, the method comprising the steps of adding, at an originator of the packet, a time to live (TTL) value field to time sensitive packets wherein the TTL value is set to an initial value, determining, at each network entity along the path, a priority level for each time sensitive packet received, the priority level determined in accordance with the TTL value extracted from the packet, distributing each time sensitive packet to one of a plurality of queues in accordance with the priority associated with the packet and replacing the TTL value field in the packet with the previous TTL value modified to reflect the time the packet spent in the current network element.

There is also provided in accordance with the present invention an apparatus for dynamically prioritizing packets in a network entity according to their sensitivity to time delays comprising means for adding, at an originator of the packet, a time to live (TTL) value field to time sensitive packets wherein the TTL value is set to an initial value, means for determining a priority level for each time sensitive packet received by the network entity, the priority level determined in accordance with the TTL value associated with the packet, a plurality of queues for holding time sensitive packets, the plurality of queues divided into a plurality of groups, each group corresponding to a different priority level, a distributor adapted to place each time sensitive packet into one of the plurality of queues in accordance with the priority associated with the packet and means for replacing the TTL value field in the packet with the previous TTL value modified to reflect the time the packet spent in the network element.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
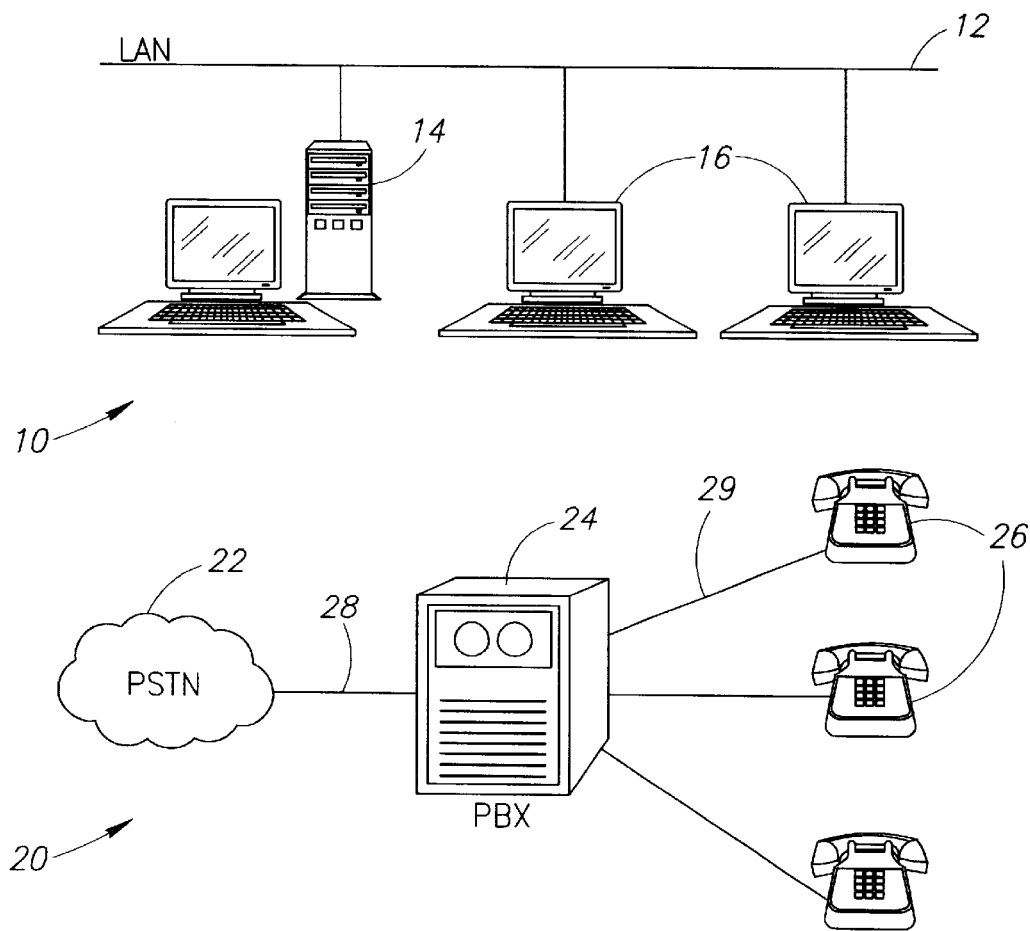
FIG. 1 is a block diagram illustrating example separate prior art data and voice networks.
Figure 2:
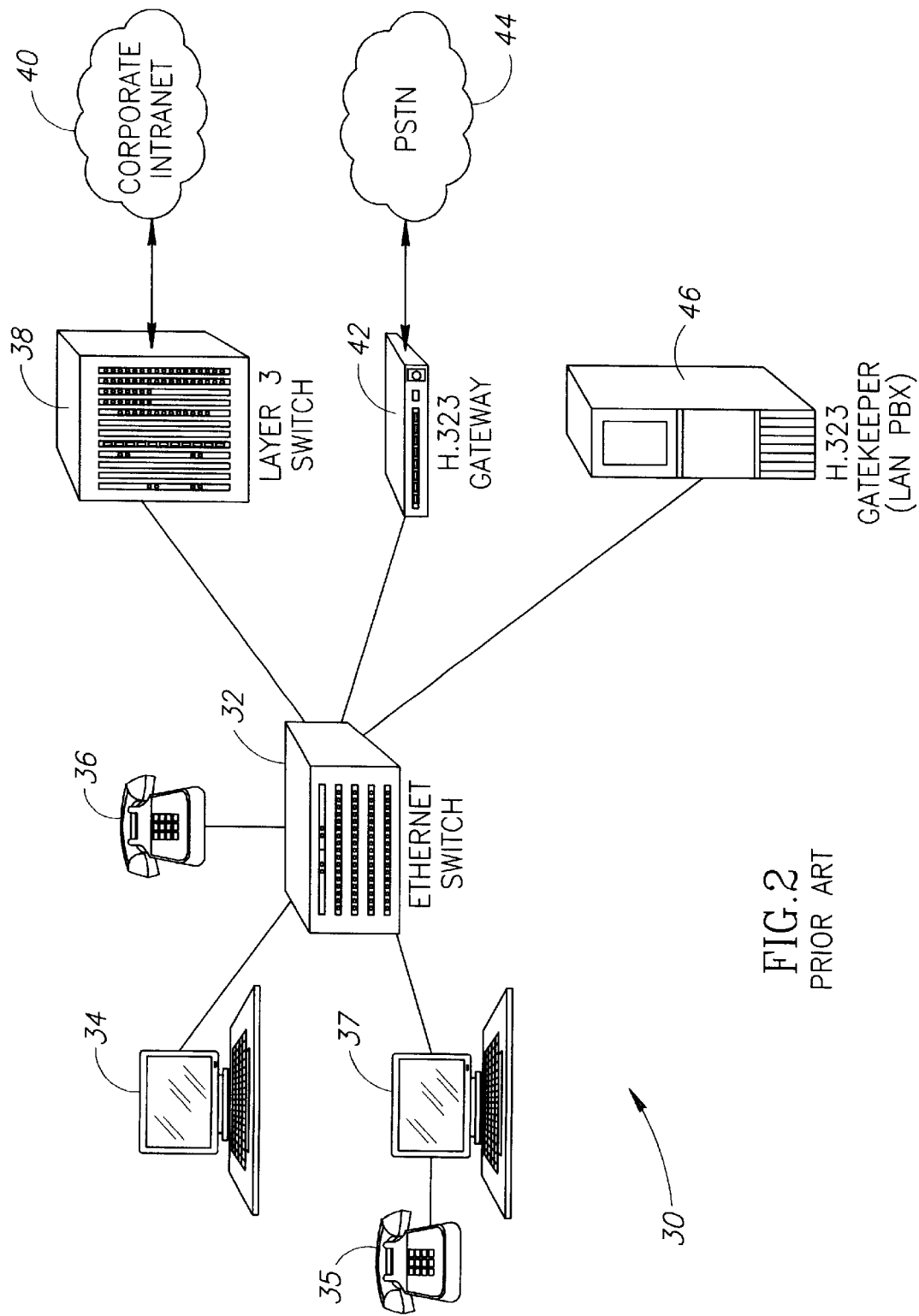
FIG. 2 is a block diagram illustrating a prior art voice over packet network where voice and data share a common infrastructure.
Figure 3:
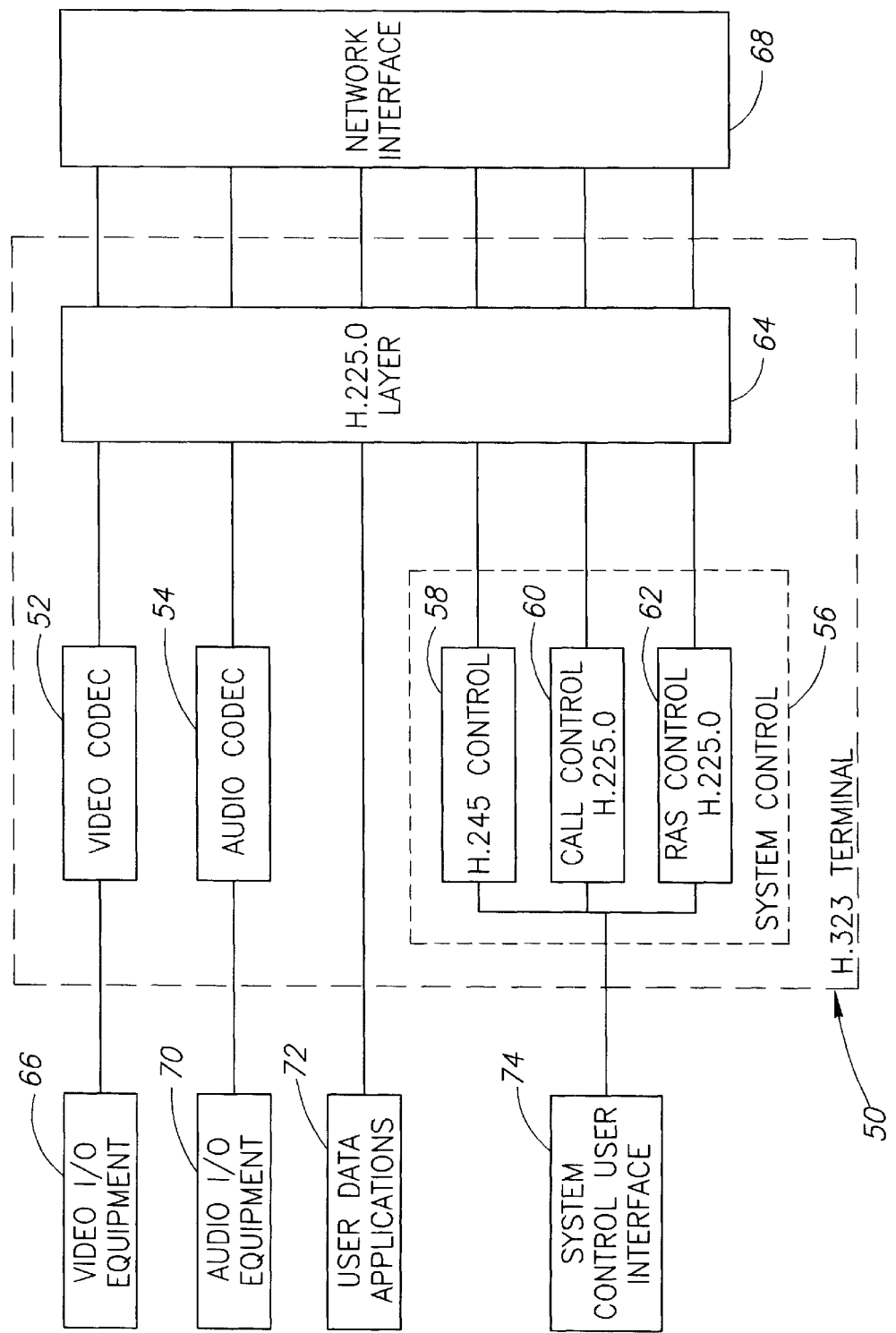
FIG. 3 is a block diagram illustrating an example prior art H.323 compliant terminal equipment.

The following notation is used throughout this document.

| Term | Definition |
|---|---|
| ACD | Automatic Call Distribution |
| ATM | Asynchronous Transfer Mode |
| IP | Internet Protocol |
| ISDN | Integrated Services Digital Network |
| ITU | International Telecommunications Union |
| LAN | Local Area Network |
| MC | Multipoint Controller |
| MCU | Multipoint Control Network |
| MP | Multipoint Processor |
| OC | Optical Carrier |
| PBX | Private Branch Exchange |
| PC | Personal Computer |
| PSTN | Public Switched Telephone Network |
| QoS | Quality of Service |
| RAS | Registration, Admission and Status |
| RSVP | Resource Reservation Protocol |
| RTCP | Real-Time Transport Control Protocol |
| RTP | Real-Time Transport Protocol |
| SCN | Switched Circuit Network |
| TCP | Transmission Control Protocol |
| TSAP | Transport layer Access Service Point |
| TTL | Time To Live |
| UDP | User Datagram Protocol |
| VLAN | Virtual Local Area Network |
| WAN | Wide Area Network |

Definitions Used Throughout

The following definitions are used throughout this document.

| Term | Definition |
| --- | --- |
| Call | Point to point multimedia connection between two H.323 endpoints. The call begins with the call setup procedure and ends with the call termination procedure. |
| Call signaling channel | Reliable channel used to convey the call setup and teardown messages between two H.323 entities. |
| Channel | A channel is a uni-directional link between two endpoints. |
| Endpoint | An H.323 terminal, gateway or MCU. An endpoint can call and be called, it generates and/or terminates information streams. |
| Gatekeeper | An H.323 entity on the network that provides address translation and controls access to the network for H.323 terminals, gateways and MCUs. |
| Gateway | An endpoint on the network which provides for real-time, two-way communications between H.323 terminals on the packet based network and other ITU terminals (e.g., ISDN, ATM, etc.) on a switched circuit network. |
| H.323 entity | Any H.323 component including terminals, gateways, gatekeepers, MPs, MCs and MCUs. |
| RTP Packet | A data packet consisting of the RTP header, a possibly empty list of contributing sources and the payload data. |
| RTP Payload | The data transported by RTP in a packet. |
| RTP Session | For each participant, the session is defined by a pair of destination Transport Addresses (one Network Address plus a TSAP identifier pair for RTP and RTCP). The destination Transport Address may be common for all participants or may be different for each. In a multimedia session, the media audio and video are carried in separate RTP sessions with their own RTCP packets. The multiple RTP sessions are distinguished by different Transport Addresses. |
| Switched Circuit Network | A public or private switched telecommunication network such as the PSTN, ISDN, etc. |
| Terminal | An H.323 terminal is an endpoint on the network which provide for real-time, two-way communications with another H.323 terminal, gateway or MCU. |
| Transport Address | The transport layer address of an addressable H.323 entity as defined by the network protocol suite in use. The Transport Address of an H.323 entity is composed of the Network plus the TSAP identifier of the addressable H.323 entity. |
| TSAP Identifier | The piece of information used to multiplex several transport connections of the same type on a single H.323 entity with all transport connections sharing the same Network Address (e.g., the port number in a TCP/UDP/IP environment). TSAP identifiers may be assigned statically by an external authority or assigned dynamically during the setup of a call. |
| Zone | The collection of all terminals, gateways and MCUs managed by a single gatekeeper. A zone includes at least one terminal and may or may not include gateways or MCUs. A zone has one and only one gatekeeper. |

General Description

The present invention solves the problems associated with the prior art by providing an apparatus for and a method of dynamically prioritizing packets over a packet based network. Such a packet network may comprise, for example, an IP based network running over Ethernet, Token ring, etc. The present invention provides a solution to the congestion problem that is not resolved by prior art priority schemes.

The present invention dynamically prioritizes packets on the basis of their 'time to live' in the network. In other words, packets are assigned a priority in accordance with their degree of freshness or staleness. Packets with a relatively long time left are given lower priority then those with relatively little time left. In general, packets generated by real-time multimedia applications such as audio, video, etc. have a finite life span. Once that life span has passed, they are of little value. Thus, in a real-time audio application, for example, packets must arrive at their destinations in sufficient time to be played to the user in analog format. Packets representing a user's voice corresponding to a point in time earlier than the current time are useless as their window of playback at the destination has passed. These packets are of no use to the user as their time has passed and they are thus discarded.

Note that the present invention is effective to dynamically assign a priority to the individual packets within a data stream belonging to a particular session. The priority is dynamically assigned based on the level of congestion experienced by the individual packet along the path. This is in contrast to prior art protocols that assign priority on a session basis where the same priority is assigned to the entire data stream for that session.

Optionally, the prioritization method of the present invention may be used within a hierarchical priority scheme whereby a priority is assigned to the data stream as a whole, e.g., using RSVP. In this case, the dynamic prioritization method of the present invention can be used as a sub priority scheme wherein a priority is dynamically assigned to individual packets in accordance to the congestion level experienced along the path.

The present invention is operative to add a field to the packet as it travels from network entity to entity. The contents of the time to live (TTL) field represents how 'young' or 'old' the packet is and conveys the time left before the packet is no longer of any use. Each network entity that receives the packet with a TTL field, subtracts from it the time the packet spent in that entity. Thus, the TTL field decreases as it hops from network entity to entity in the network.

Figure 4:
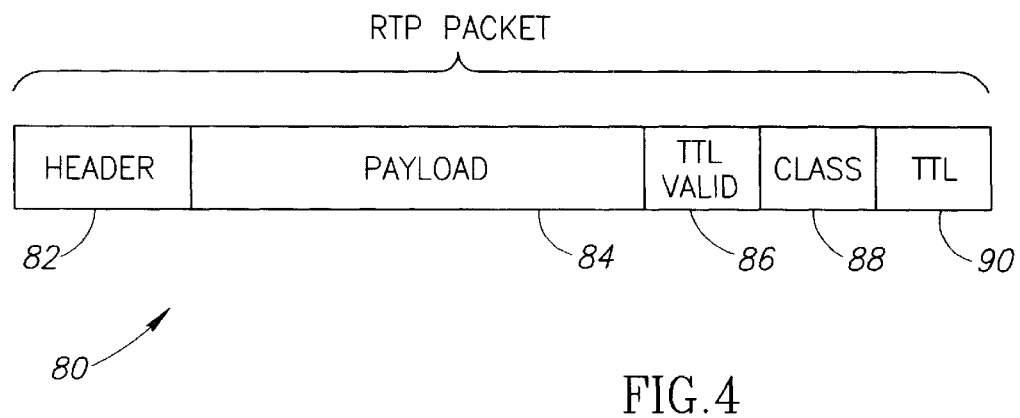
FIG. 4 is a diagram illustrating the RTP packet modified in accordance with the present invention to carry the TTL valid, class and TTL fields.

A diagram illustrating the RTP packet modified in accordance with the present invention to carry the TTL valid, class and TTL fields is shown in FIG. 4. The modified RTP packet, generally referenced 80, comprises a header portion 82, payload 84, TTL valid field 86, class field 88 and TTL field 90.

In one example embodiment of the present invention, the TTL valid, class and TTL field information is conveyed in the RTP packet The H.225.0 standard includes an extension mechanism to allow individual implementations to provide new payload-format-independent functions that require additional information to be carried in the RTP packet header 82. The mechanism is designed to permit implementations that do not perform the present invention to ignore the header extension and thus interoperate with those that do perform the invention.

The variable length header extension is appended to the RTP header when the X bit in the RTP header is set to one. The header extension comprises a 16-bit length field that counts the number of 32 bit words in the extension. Additional information about RTP packets can be found in the ITU-T Recommendation H.225.0

Alternatively, the TTL related information may be appended to the payload itself and placed in the payload portion 84 of the RTP packet rather than be conveyed in a header extension.

The TTL valid field 86 is a one-bit field that indicates whether the TTL information is present or not. A one indicates valid TTL information is present and a zero indicates that no TTL information is present. The class field 88 indicates the particular class the originator of the packet has assigned the packet to. Preferably, the class field 88 is standardized among vendors of network equipment. This field may be of any length that is sufficient to convey all the possible classes. The TTL field 90 represents the time left for the particular packet. Young packets (i.e., fresh packets) have larger TTL field values than older packets. The units of the TTL field 90 is preferably in milliseconds.

At the time the packet is generated, the TTL field 90 is initialized to a value. The initial value can be set to any suitable value and in the typical LAN environment is preferably set to 125 milliseconds. This initial value number is derived taking into consideration the nature of the limits of human perception to the effects of delayed or missing packets (i.e., gaps in the audio). There is a limit of the period of time between samples that is acceptable to human hearing whereby a gap or an interruption in the audio will not be noticed. Preferably, the initial value for the TTL field 90 takes this into account.

As the packet travels from one network entity to another, the TTL field is examined and a priority is determined based thereon. The network entity then places the packet into one of a plurality of queues corresponding to the assigned priority. Packets are then processed in accordance with their assigned priority.

Figure 5:
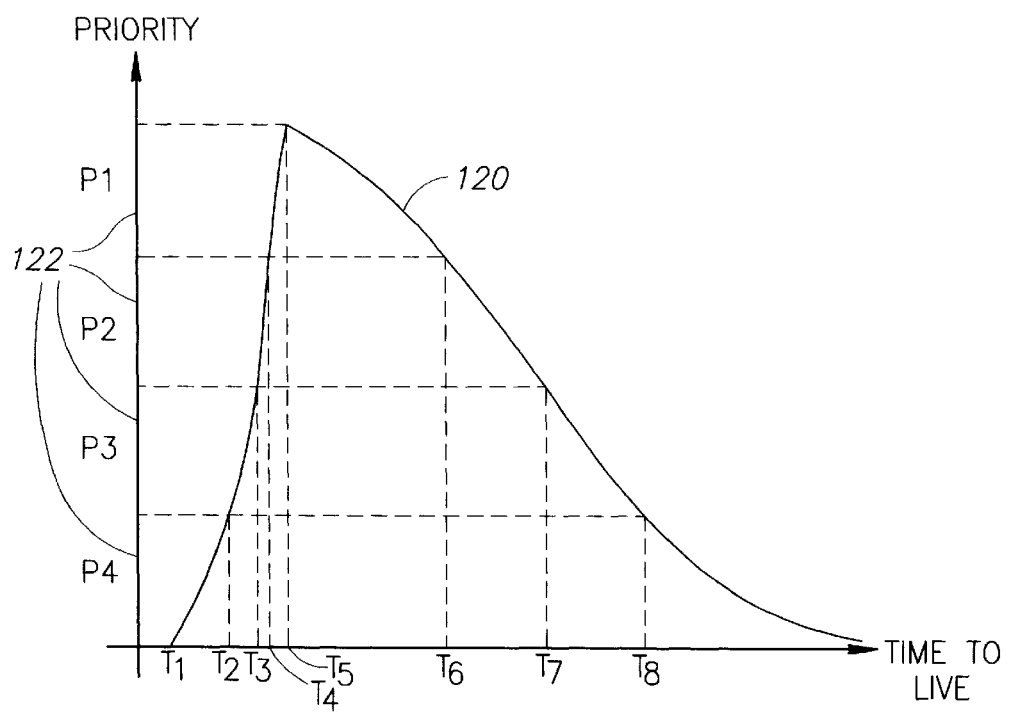
FIG. 5 is a graph illustrating an example priority versus time to live mapping used by network entities to prioritize incoming packets.

The priority is determined based on the contents of the time to live field carried in the packet (e.g., an RTP packet). The network entity determines the priority from the time to live field in accordance with a predetermined mapping. A graph illustrating an example priority versus time to live mapping used by network entities to prioritize incoming packets is shown in FIG. 5. The curve 120 is at a minimum priority at time $T_1$ and rises to a maximum priority at time $T_5$. In accordance with the curve, packets with larger TTL values are assigned less priority based on the rationale that they have a longer time to live. Thus, this example curve gives precedence to packets with smaller TTLs.

A maximum is reached, however, whereby smaller TTLs map to lower priorities. This is due to the fact that after a certain time, packets that are still traveling through the network have less and less a chance of arriving at their destinations sufficiently early enough to be useful. After a certain amount of time, the packet cannot be used since its time window has come and gone.

For example, with reference to FIG. 5, packets are classified into one of four classes 122 represented by priorities P1 through P4 with P1 having the highest priority and P4 the lowest. Packets that arrive with TTL field values smaller than $T_1$ are discarded since they are stale to an extent that they cannot be used at the destination. Packets with TTL field values between $T_1$ and $T_2$ are assigned priority P4, the lowest priority. These packets have marginally sufficient time to be useful at the destination. Packets with TTL field values between $T_2$ and $T_3$ are assigned priority P3. Packets with TTL field values between $T_3$ and $T_4$ are assigned priority P2.

Packets with TTL field values between $T_4$ and $T_6$ are assigned priority P1, the highest priority, as these packets are on the borderline of becoming stale if they remain in the network much longer. Packets with TTL field values between $T_6$ and $T_7$ are assigned priority P2, since they are fresher. Likewise, packets with TTL field values between $T_7$ and $T_8$ are assigned priority P3, since they are fresher still with high TTL values. Packets with TTL field values higher than $T_8$ are assigned priority P4, the lowest priority, since they have the largest TTL values.

Figure 6:
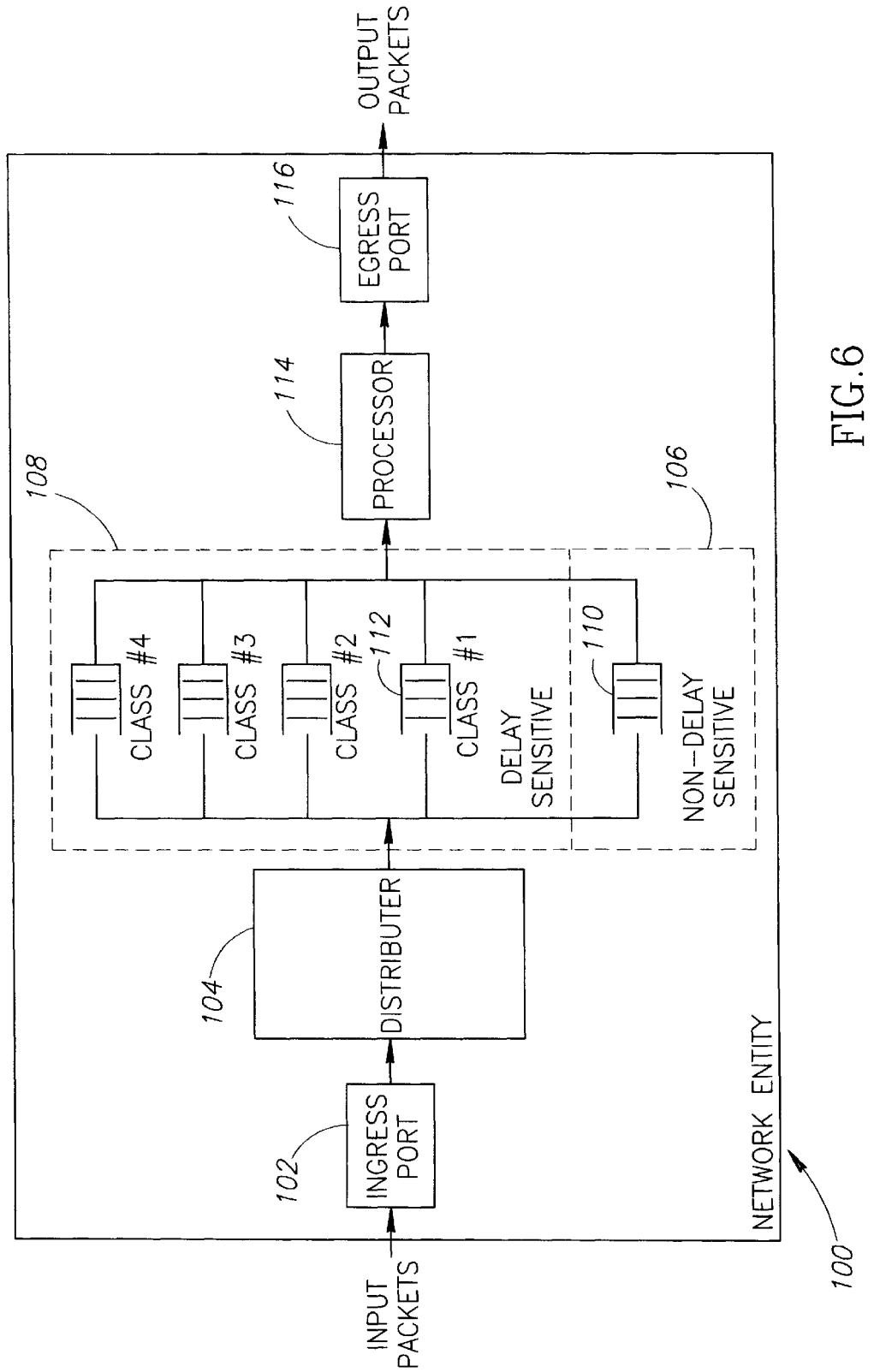
FIG. 6 is a block diagram illustrating a network entity constructed in accordance with the present invention to perform the prioritization method of the invention.

A block diagram illustrating a network entity constructed in accordance with the present invention to perform the prioritization method of the invention is shown in FIG. 6. The network entity, generally referenced 100, may comprise any network device operable in the packet based network. The block diagram presented herein describes the components used to construct the apparatus for performing the prioritization method in accordance with the present invention. The apparatus described herein may be applied by one skilled in the art to numerous other types of network elements.

The network entity 100 comprises an ingress port 102, distributor 104, delay sensitive queues 108 and non-delay sensitive queues 106, a processor 114 and egress port 116. In operation, input packets arrive at the ingress port 102 where they are forwarded to the distributor 104. The distributor 104 functions to extract the TTL related information from the packet used to convey such information, i.e., the RTP packet. In particular the distributor 104 examines the TTL valid field 86, class field 88 and TTL field 90. The distributor 104, utilizing the appropriate curve mapping TTL to priority, makes a determination as to which priority queue to forward the packet to. The distributor 104 may be configured with more than one curve whereby each class or group of classes have corresponding priority mapping curves such as the curve 120 illustrated in FIG. 5. The class field inserted into the packet by the originator, corresponds to one of the class queues. Classification is performed by the originator in accordance with the particular application that generated the packet.

The network device comprises queues 106 that are non-delay sensitive, i.e., for transmission of data, and also comprises queues 108 that are time delay sensitive. The device 100 may comprise a plurality of time delay sensitive queues whereby each class (i.e., priority) has associated with it one or more queues. In the example illustrated in FIG. 6, class #1 through class #4 each have a single queue associated with them. Note, however, any number of queues may be assigned to a class.

The processor 114 is adapted to retrieve packets from the queues 106, 108 and process them according to the intended function of the particular network device 100. The order of retrieving packets from the queues 106, 108 is related to the various priority levels previously assigned to the packets. The processing resources of the processor 114 are distributed in some form among all the queues vying for service.

To distribute processing resources, each queue is assigned a percentage of the processing capacity of the processor 114. For example, assuming 100% available resources, the time delay sensitive queues may be assigned a combined 80% of the resources while the non-delay sensitive queues are assigned the remaining 20%. The 80% can then be further broken down by priority level: class #4, corresponding to priority level P4, is assigned 5% of processing resources; class #3, corresponding to priority level P3, is assigned 10%; class #2, corresponding to priority level P2, is assigned 15%; and class #1, corresponding to priority level P1, is assigned 50%. Note that the above allotment of resources is presented for illustration purposes only. Resources may be allotted in any suitable fashion in accordance with the particular application.

In this example, the non-delay sensitive queue is assigned 20% of processing resources. Note that it is not preferable to reduce the resource allocation of the non-delay sensitive queue to zero as this result in a starvation situation for this queue.

Note that in accordance with the present invention the processor 114 or other driver retrieves packets from the queues 106, 108 in accordance with the order of priority while maintaining minimum processing resource allocations for each queue. Thus, the minimum processor resources allocated to the non-delay sensitive queue is 20%.

The packets processed by the processor 114 are passed to the egress port 116 for output to the network. The processor 114 or other management entity may also function to set the priority levels represented by the mapping curves on a dynamic basis in accordance with either an internal or external management entity.

Further, the processor 114 can optionally be configured to provide feedback to the originator of the packet. For example, the level of the queues may be fed back to the originator to enable it to tweak the initial value for the TTL field 90. If the level of a queue drops and the origin is sending packets at a steady rate (e.g., every 125 ms.) than this indicates a high congestion level in the network. In response, the originator can lower the initial value of the TTL field 90 to a value (e.g., from 125 to 120 ms.) that is more suitable for the current congestion level in the network.

The originator of the packet can be informed via one or more RTCP messages indicating the low queue level such as due to a high congestion level in the network. In response, the originator can lower the initial value of the TTL field. This causes the packet to be classified with a higher priority as it travels from one network entity to another. A lower time to live value forces the classification of the packet into a higher priority level because the packet now corresponds to a place on the curve mapping TTL with priority that is closer to the peak priority. When the queue level stabilizes (i.e. congestion level in the network drops), another RTCP message is sent indicating this to the source of the packet. In response, the source increases the initial TTL field value.

The method of the dynamic prioritization method will now be described in more detail. Initially, the types of applications anticipated are divided into one or more classes, each class corresponding to a priority level. The classification of applications is performed in accordance with the application's sensitivity to delay. Typically, data is not time sensitive while real-time voice or video applications are. A time to live (TTL) field is provided to convey the TTL value from hop to hop. Note that the TTL field, TTL valid flag and class field can be conveyed in any suitable manner such as in an RTP packet as described hereinabove (either as a payload extension or in a header extension) or in a UDP level encapsulation packet.

Figure 9:
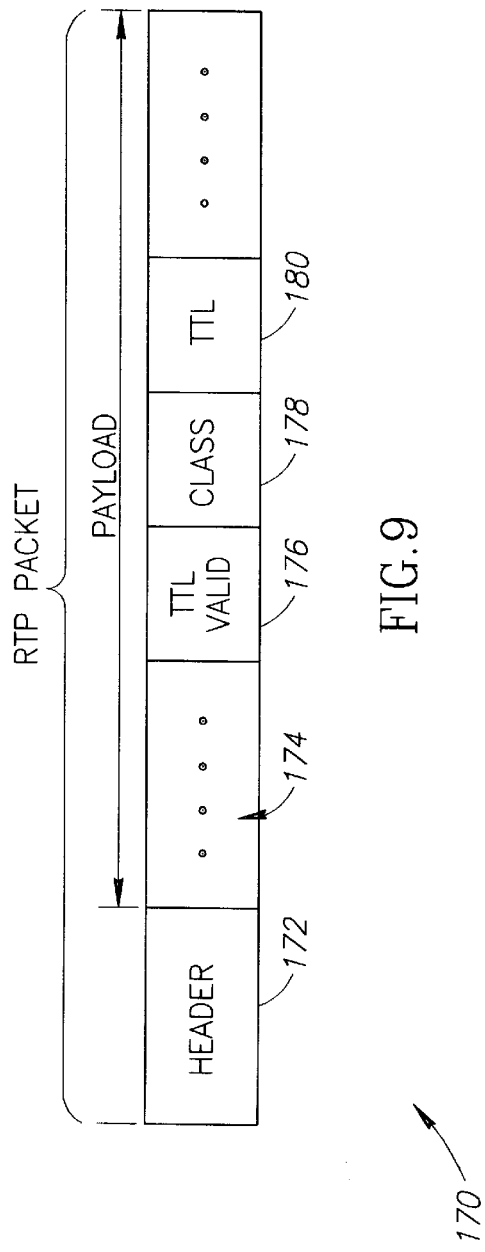
FIG. 9 is a diagram illustrating an RTP packet modified in accordance with the present invention to carry the TTL valid, class and TTL fields in the payload portion thereof.

A diagram illustrating an RTP packet modified in accordance with the present invention to carry the TTL valid, class and TTL fields in the payload portion thereof is shown in FIG. 9. The RTP packet, generally referenced 170, comprises a header portion 172 and payload portion 174. The payload portion 174 comprises the TTL valid field 176, class field 178 and TTL field 180.

Figure 10:
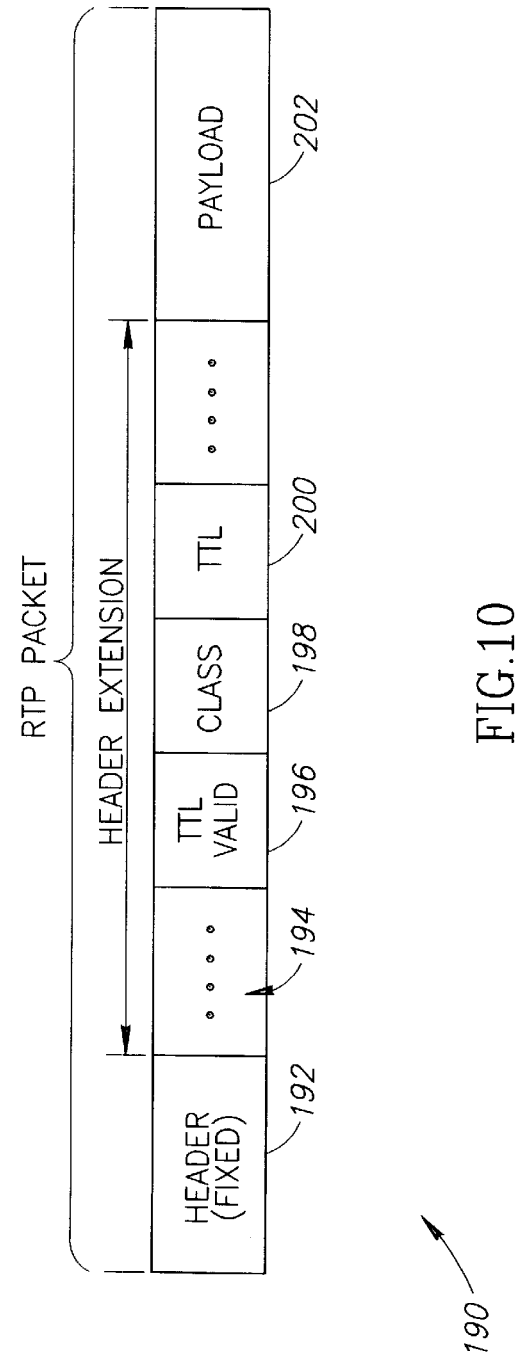
FIG. 10 is a diagram illustrating an RTP packet modified in accordance with the present invention to carry the TTL valid, class and TTL fields in the header extension portion thereof.

A diagram illustrating an RTP packet modified in accordance with the present invention to carry the TTL valid, class and TTL fields in the header extension portion thereof is shown in FIG. 10. The RTP packet, generally referenced 190, comprises a fixed header portion 192, header extension portion 194 and payload portion 202. The header extension portion 194 comprises the TTL valid field 196, class field 198 and TTL field 200.

Figure 11:
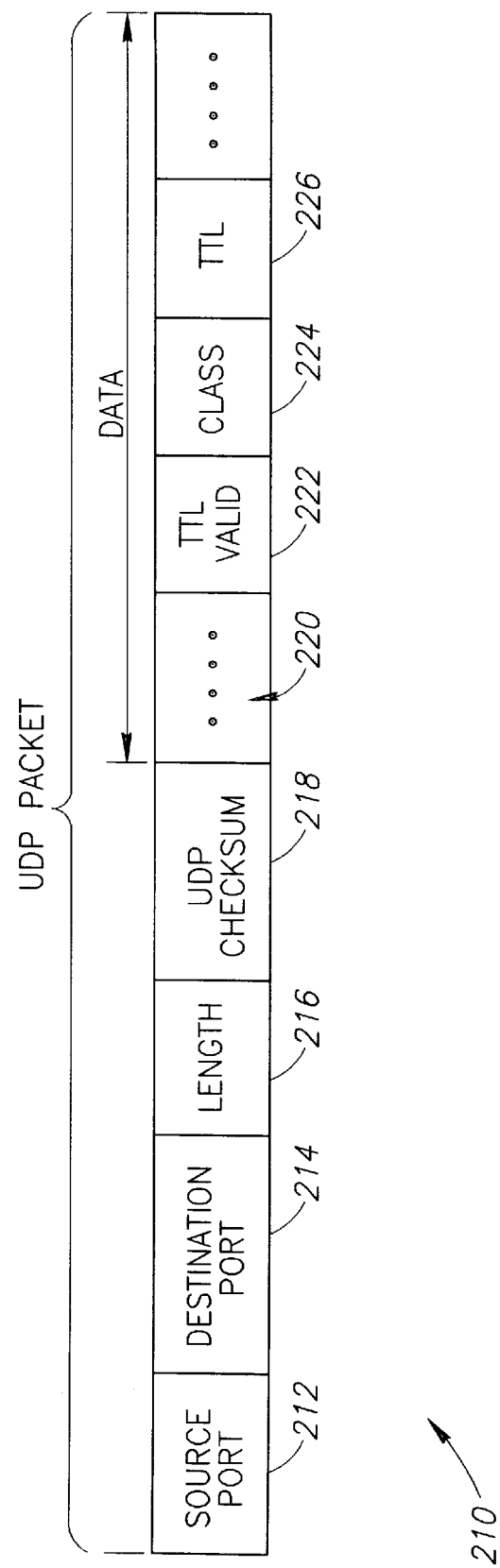
FIG. 11 is a diagram illustrating a UDP packet modified in accordance with the present invention to carry the TTL valid, class and TTL fields in the data portion thereof.

A diagram illustrating a UDP packet modified in accordance with the present invention to carry the TTL valid, class and TTL fields in the data portion thereof is shown in FIG. 11. The UDP packet, generally referenced 210, comprises a source portion field, 212, destination field 214, length field 216, UDP checksum field 218 and a data field 220. The data field 220 comprises the TTL valid field 222, class field 224 and TTL field 226.

The classes of applications is divided into those that are time sensitive and those that are not. The time sensitive applications can be further classified as audio, voice, video, etc. For each class, one or more priority queues are defined on the network entities. For each class, a curve mapping TTL to priority is generated and configured in network entities. The distributor 104 (FIG. 6) is configured with the TTL to priority mappings. Note that the same mapping curve may be used for one or more classes. Mapping curves are generated taking into consideration the sensitivity of each type of packet to time delay, i.e., the time delay tolerance each type of packet can withstand.

Figure 7:
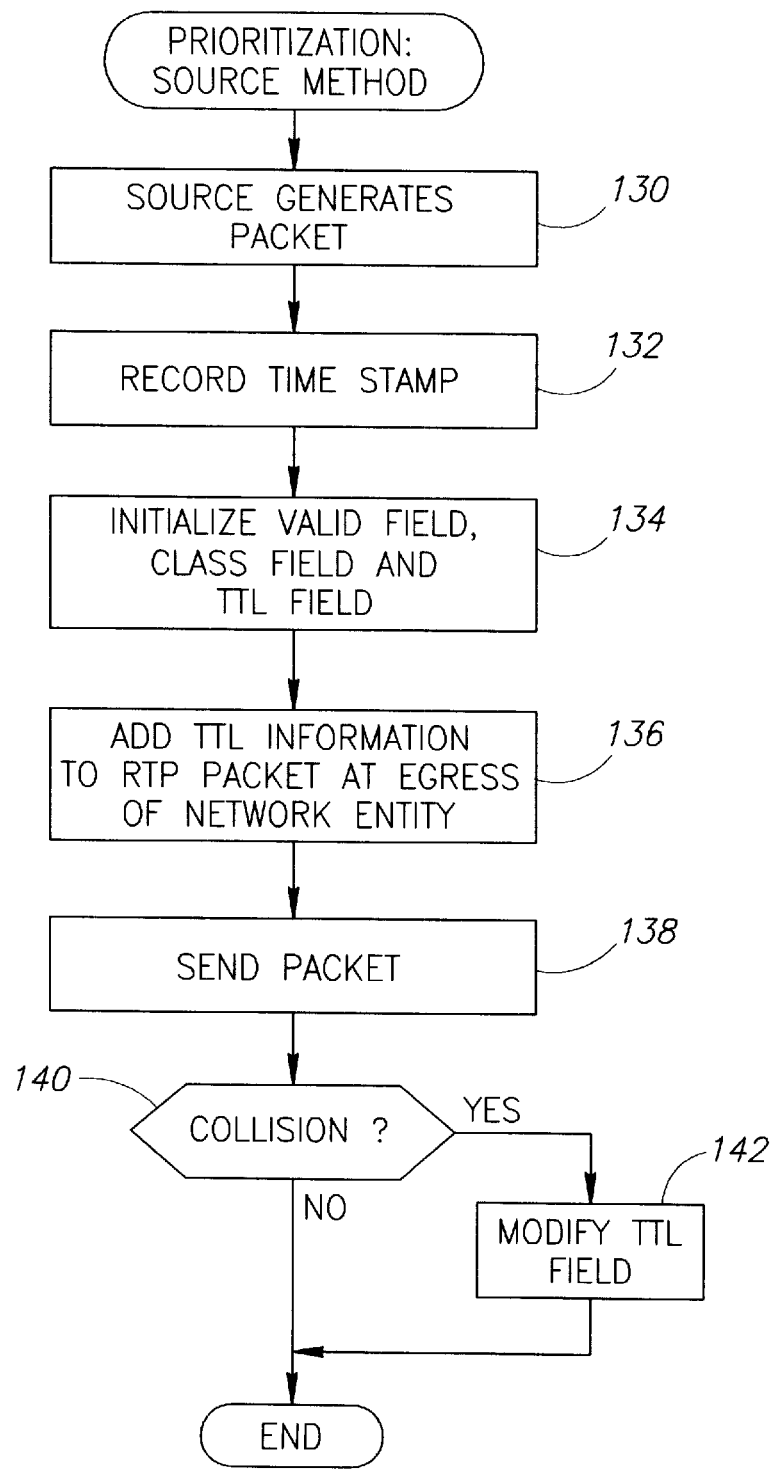
FIG. 7 is a flow diagram illustrating the prioritization method of the present invention performed at the source of the packet.

A flow diagram illustrating the prioritization method of the present invention performed at the source of the packet is shown in FIG. 7. Initially, the source generates a packet to be sent over the network (step 130). The source then records the current time and stores it with the associated packet in memory (step 132). The TTL valid bit, class field and TTL field are then initialized (step 134). For typical operating environments, the TTL field is initialized to 125 milliseconds.

The TTL related information is then added to the RTP packet at the egress of the network entity (step 136). Note that the TTL information is added only for packets generated by time sensitive applications, i.e., that were previously classified into a time delay sensitive class. Note that the TTL information can be encapsulated at any level but is preferably encapsulated in Layer 4 or higher. As described previously, the initial value is affected by the RTCP reply regarding the remote queuing, whereby the initial value is lowered if the FIFO level drops indicating large jitter (i.e., congestion delay) along the path. The packet is then transmitted (step 138) and if a collision occurs (step 140), the time stamp previously recorded is modified to reflect the delay imposed by the collision.

Figure 8:
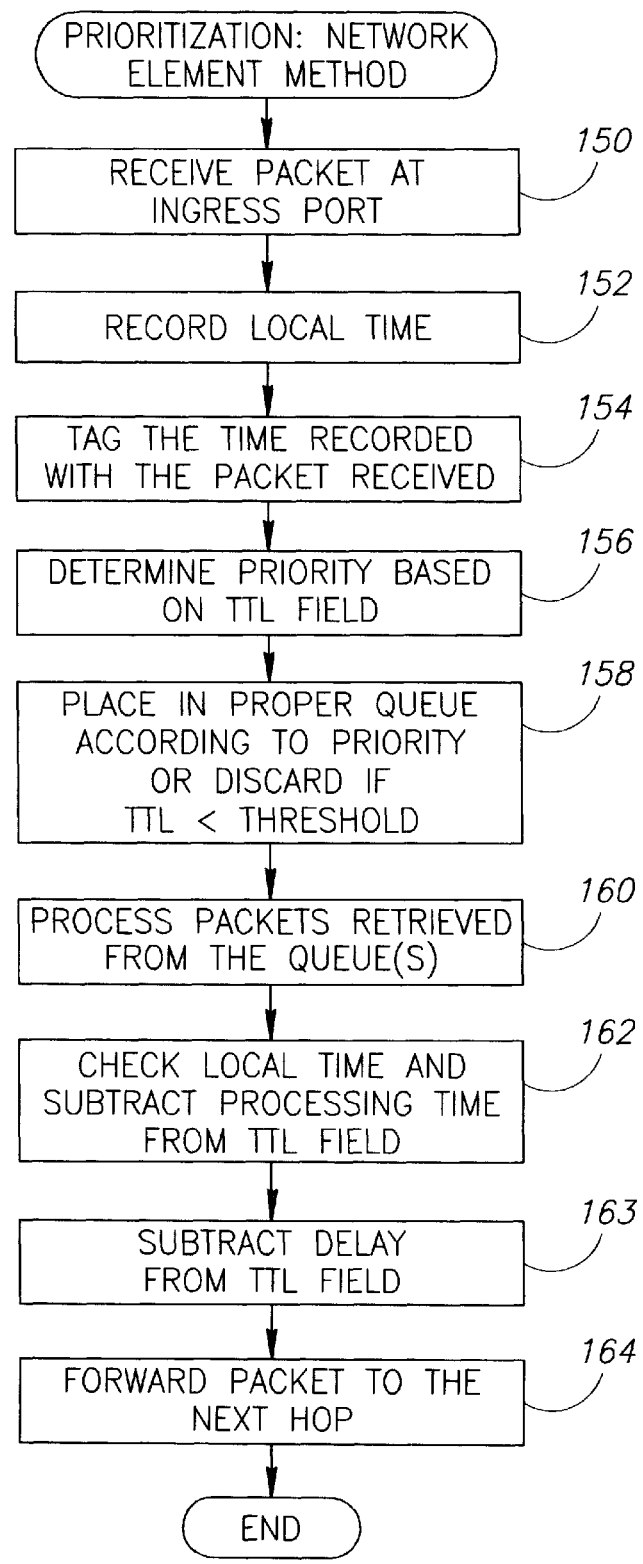
FIG. 8 is a flow diagram illustrating the prioritization method of the present invention performed on network entities along the path of the packet.

A flow diagram illustrating the prioritization method of the present invention performed on network entities along the path of the packet is shown in FIG. 8. Initially, the packet arrives at the ingress port in the network entity, e.g., a router, switch, etc. (step 150). The time of arrival according to the local time of the network entity is recorded (step 152). The time recorded is tagged with the packet received (step 154). The distributor then extracts the TTL information including TTL valid bit, class and TTL field. It then determines the priority in accordance with the value of the TTL field (step 156). The priority is determined using the appropriate priority mapping curve such as the curve shown in FIG. 5. The value of the class field may be used to determine the appropriate mapping curve to use.

Based on the priority determined, the distributor places the packet onto the appropriate queue in accordance with its priority (step 158). During this step, if the TTL field is less than a threshold, the packet is discarded. The processor retrieves packets from the queue in accordance with a previously allocated resource distribution (step 160). It is important to note that all priority categories receive processor time so as to prevent starvation of any one queue. The higher priority queues, however, receive more processor time while low priority (e.g., non-delay sensitive streams) receive less processor time. This is regardless of the priority assigned to the packet via other protocols such as RSVP.

Once processing is complete, the delay encountered by the packet while passing through the network entity is calculated (step 162). The delay is then subtracted from the TTL field (step 163). Note that each time the packet is transmitted over a shared media, the particular network entity sets the TTL field accordingly. In addition, any collisions that occur are taken into consideration whereby the time waiting for retransmission is factored into the value set in the TTL field. The packet with the new TTL field is then forwarded to the next hop via the egress port (step 164).

In network entities that are not able to calculate the delay time the packet spends passing through the entity, an average can be used. Further, switched network elements are likely to have negligible processing times.

Note that the invention is backward compliant in that network devices, adapted to perform the invention, treat packets that do not have a TTL field as having infinite time to live. Thus, packets without a TTL field are assigned the lowest priority under that class.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method for dynamically prioritizing time sensitive packets for transmission over a packet based network, said method comprising the steps of:
    adding, at an originator of said packet, a time to live (TTL) value field to time sensitive packets wherein said TTL value is set to an initial value;
    determining, at each network entity along the path, a priority level for each time sensitive packet received, said priority level determined in accordance with the TTL value extracted from said packet;
    distributing each time sensitive packet to one of a plurality of queues in accordance with the priority associated with said packet; and
    replacing said TTL value field in said packet with the previous TTL value modified to reflect the time said packet spent in the current network element.

2. The method according to claim 1, further comprising the step of adding, at the originator of said packet, a TTL valid field adapted to indicate whether valid TTL information is incorporated in said packet.

3. The method according to claim 1, further comprising the step of adding, at the originator of said packet, a class field adapted to indicate the classification of said packet into one of a plurality of classes.

4. The method according to claim 3, wherein said classification is performed in accordance with the type of application generating said packet.

5. The method according to claim 1, further comprising the step of modifying said initial value in accordance with the congestion level in said network.

6. The method according to claim 1, further comprising the step of lowering said initial value at said packet originator when an increase in network congestion levels is detected, thus raising the priority of said packets as they traverse the network.

7. The method according to claim 1, further comprising the step of raising said initial value at said packet originator when a decrease in network congestion levels is detected, thus lowering the priority of said packets as they traverse the network.

8. The method according to claim 1, wherein said TTL value field is conveyed in a payload portion of a Real-Time Transport Protocol packet.

9. The method according to claim 1, wherein said TTL value field is conveyed in a header extension portion of a Real-Time Transport Protocol packet.

10. The method according to claim 1, wherein said TTL value field is conveyed in a User Datagram Protocol encapsulated packet.

11. The method according to claim 1, wherein said step of distributing comprises the step of discarding packets whose TTL values are lower than a predetermined threshold.

12. The method according to claim 1, said step of determining comprises the step of creating a mapping adapted to convert a TTL value into a corresponding priority level.

13. An apparatus for dynamically prioritizing packets in a network entity according to their sensitivity to time delays, comprising:
    means for adding, at an originator of said packet, a time to live (TTL) value field to time sensitive packets wherein said TTL value is set to an initial value;
    means for determining a priority level for each time sensitive packet received by said network entity, said priority level determined in accordance with the TTL value associated with said packet;
    a plurality of queues for holding time sensitive packets, said plurality of queues divided into a plurality of groups, each group corresponding to a different priority level;
    a distributor adapted to place each time sensitive packet into one of said plurality of queues in accordance with the priority associated with said packet; and
    means for replacing said TTL value field in said packet with the previous TTL value modified to reflect the time said packet spent in said network element.

14. The apparatus according to claim 13, further comprising means for adding, at the originator of said packet, a TTL valid field adapted to indicate whether valid TTL information is incorporated in said packet.

15. The apparatus according to claim 13, further comprising means for adding, at the originator of said packet, a class field adapted to indicate the classification of said packet into one of a plurality of classes.

16. The apparatus according to claim 15, wherein said classification is performed in accordance with the type of application generating said packet.

17. The apparatus according to claim 13, further comprising means for modifying said initial value in accordance with the congestion level in said network.

18. The apparatus according to claim 13, further comprising means for lowering said initial value at said packet originator when an increase in network congestion levels is detected, thus raising the priority of said packets as they traverse the network.

19. The apparatus according to claim 13, further comprising means for raising said initial value at said packet originator when a decrease in network congestion levels is detected, thus lowering the priority of said packets as they traverse the network.

20. The apparatus according to claim 13, wherein said TTL value field is conveyed in a payload portion of a Real-Time Transport Protocol packet.

21. The apparatus according to claim 13, wherein said TTL value field is conveyed in a header extension portion of a Real-Time Transport Protocol packet.

22. The apparatus according to claim 13, wherein said TTL value field is conveyed in a User Datagram Protocol encapsulated packet.

23. The apparatus according to claim 13, wherein said distributor is adapted to discard packets whose TTL values are lower than a predetermined threshold.

24. The apparatus according to claim 13, said means for determining utilizes a predetermined mapping for converting a TTL value into a corresponding priority level.

* * * * *